United States Patent [19]

Ando

[11] 4,229,049
[45] Oct. 21, 1980

[54] HYDRAULIC PRESSURE CONTROL SYSTEM FOR SPLIT BRAKE SYSTEM

[75] Inventor: Masamoto Ando, Toyota, Japan

[73] Assignee: Aisin Seiki Kabushiki Kaisha, Aichi, Japan

[21] Appl. No.: 948,485

[22] Filed: Oct. 4, 1978

[30] Foreign Application Priority Data

Oct. 4, 1977 [JP] Japan .................................. 52-119244
Oct. 4, 1977 [JP] Japan .................................. 52-119245

[51] Int. Cl.$^2$ ............................. B60T 8/02; B60T 8/26
[52] U.S. Cl. ..................................... 303/6 C; 188/349; 303/92; 303/115
[58] Field of Search ................ 303/6 C, 22, 113–119, 303/92, 6 R, 6 A, 24, 111; 188/349, 195

[56] References Cited

U.S. PATENT DOCUMENTS

| | | | |
|---|---|---|---|
| 3,556,609 | 1/1971 | MacDuff | 303/115 |
| 3,674,317 | 7/1972 | Mangold | 303/118 |
| 3,754,792 | 8/1973 | Ishigami et al. | 303/6 C |
| 3,813,130 | 5/1974 | Ihada | 303/92 X |
| 3,977,731 | 8/1976 | Kasahara | 303/6 C |

Primary Examiner—Douglas C. Butler
Attorney, Agent, or Firm—Oblon, Fisher, Spivak, McClelland & Maier

[57] ABSTRACT

A hydraulic pressure control system for a split brake system which includes a tandem master cylinder having first and second hydraulic pressure sources, at least first and second wheel cylinders, a first brake pressure supply line communicating the first source with the first wheel cylinder, a second brake pressure supply line communicating the second source with the second wheel cylinder, a first hydraulic pressure control device positioned within the first supply line for controlling output hydraulic pressure transmitted therefrom with respect to hydraulic pressure transmitted from the first source, and a second hydraulic pressure control device positioned within the second supply line for controlling output hydraulic pressure transmitted therefrom with respect to input hydraulic pressure transmitted from the second source in response to the output hydraulic pressure transmitted from the first control device such that the output pressures of the first and second control device are proportionally controlled.

5 Claims, 5 Drawing Figures

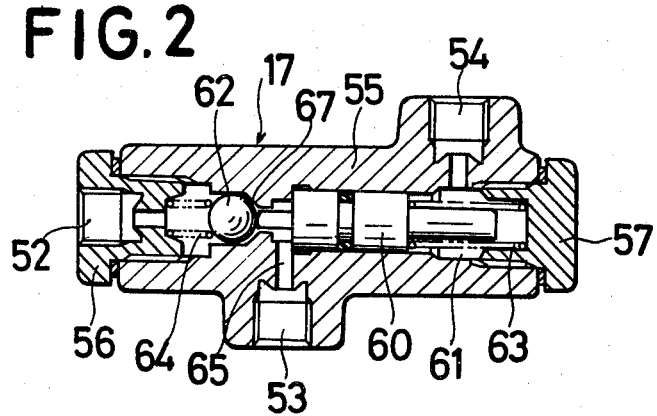
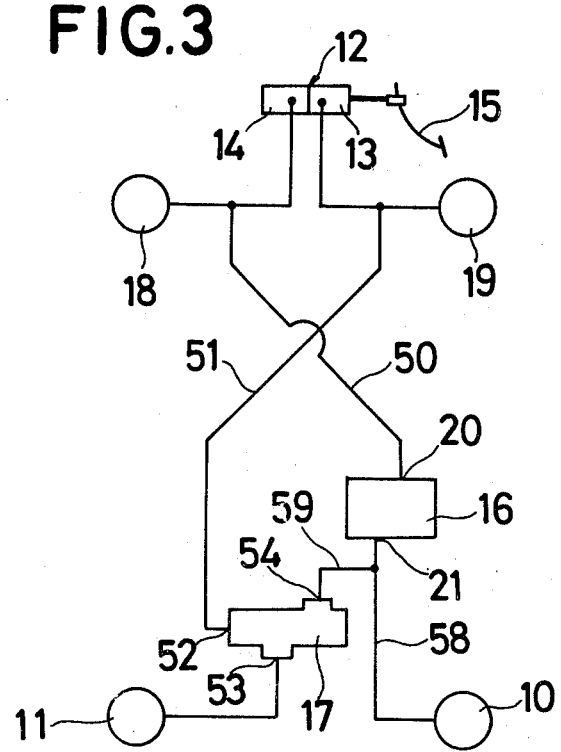

HYDRAULIC PRESSURE CONTROL SYSTEM FOR SPLIT BRAKE SYSTEM

BACKGROUND OF THE INVENTION

1. Field of the Invention

This invention relates to a hydraulic pressure control system for a split brake system.

2. Description of the Prior Art

Conventionally, in order to simultaneously control or modulate hydraulic brake pressures transmitted to both of the rear wheel cylinders of a split brake system, particularly having diagonally arranged conduits, a pair of hydraulic pressure control devices, for example, a pair of hydraulic pressure control actuators for anti-skid, have to be arranged since right and left rear wheel cylinders receive the hydraulic brake pressures from split or different sources of hydraulic pressure, respectively. Otherwise, a special or exclusive hydraulic pressure control device for the split brake system has to be arranged. However, in such prior devices, size, type and the like of devices will be exclusive and there be no resulting advantages with respect to mass production capabilities, thus necessitating high cost. Furthermore, the magnitudes of brake pressures transmitted to the right and left rear wheel cylinders will likely be different.

SUMMARY OF THE INVENTION

An object of the present invention is to provice an improved hydraulic pressure control system which obviates the above-noted prior art disadvantages.

Another object of the present invention is to provide an improved hydraulic pressure control system which is simple in construction and low in cost.

BRIEF DESCRIPTION OF THE DRAWINGS

Various other objects, features and attendant advantages of the present invention will be more fully appreciated as the same becomes better understood from the following detailed description when considereed in connection with the accompanying drawings in which like reference characters designate like or corresponding parts throughout the several views, and wherein:

FIG. 2 is a cross-sectional view of a second hydraulic pressure control device of the present invention;

FIG. 3 is a schematic view of a split brake system with the hydraulic pressure control devices of the present invention incorporated therein;

DETAILED DESCRIPTION OF THE PREFERRED EMBODIMENTS

Figure 1:
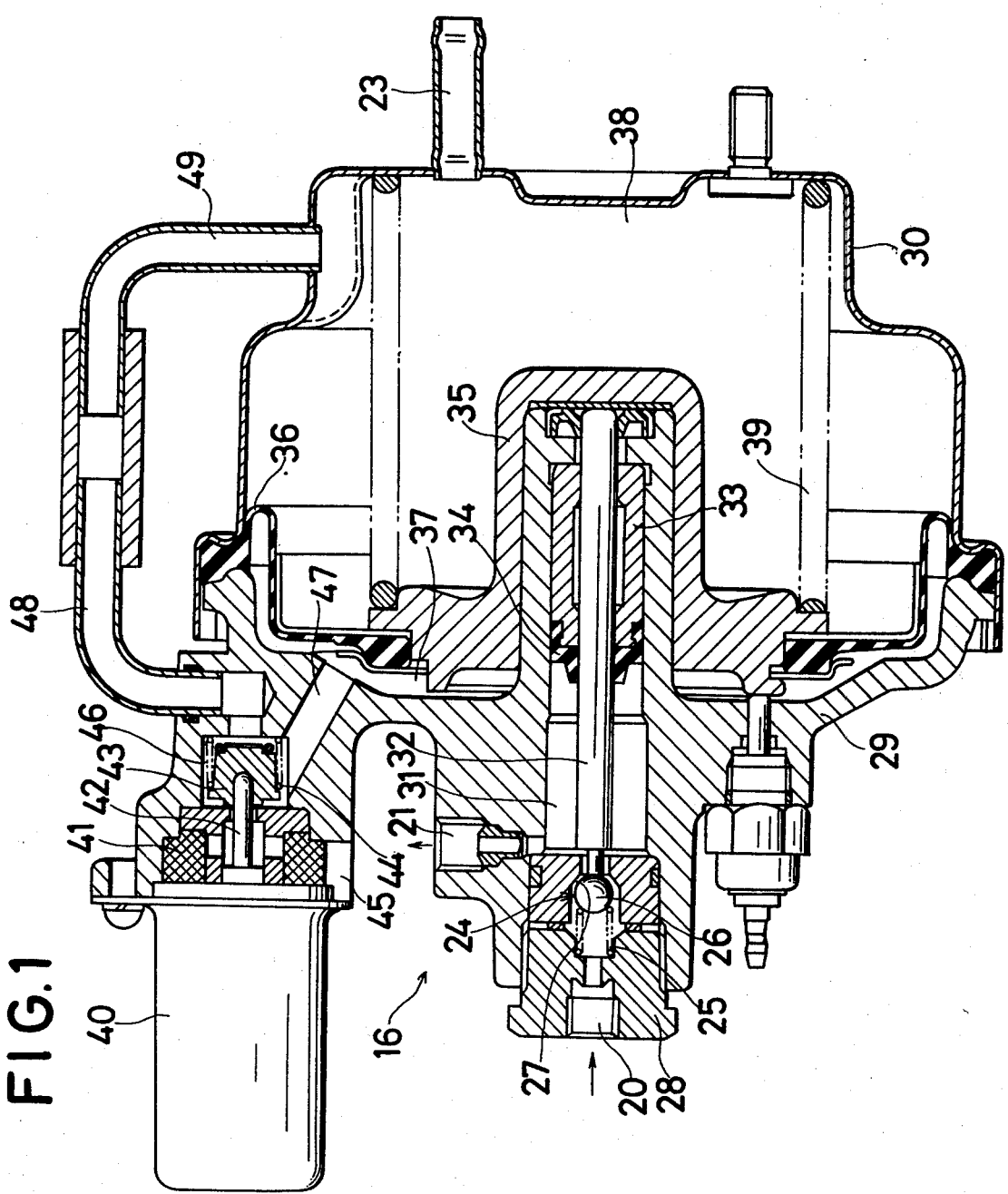
FIG. 1 is a cross-sectional veiw of a first hydraulic pressure control device of the present invention.
Figure 4:
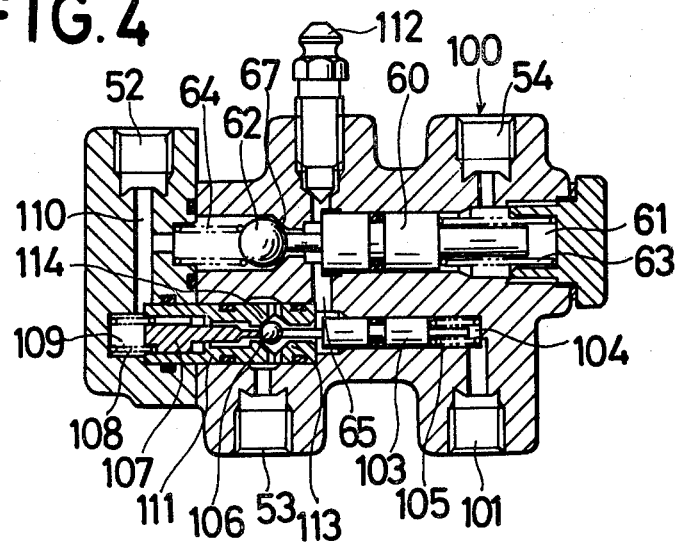
FIG. 4 is a view similar to FIG. 2, but showing a modification thereof.
Figure 5:
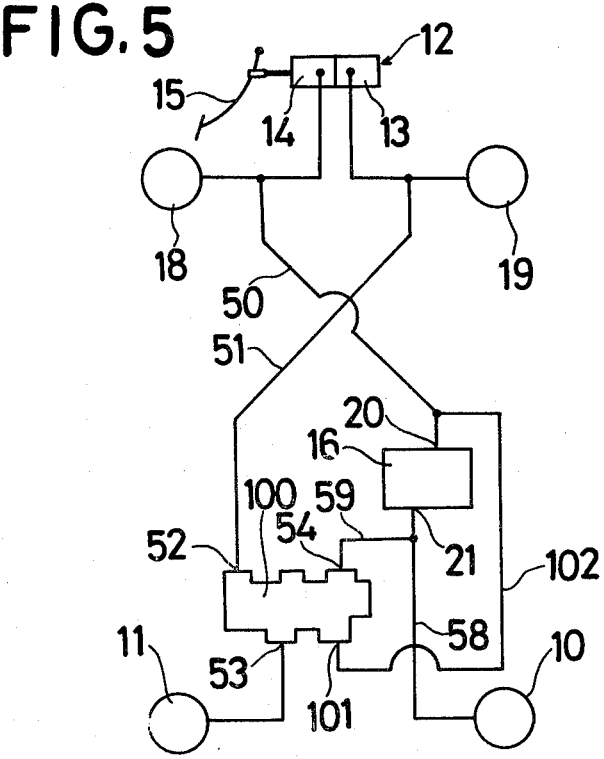
FIG. 5 is a view similar to FIG. 3, but showing a modification thereof.

In a split brake system having a diagonally arranged brake system as shown in FIG. 3, the brake pressures transmitted to right and left rear wheel cylinders 10, 11 will be adapted to be simultaneously controlled. A master cylinder 12 having first and second pressure sources 13 and 14 is operably connected to brake pedal 15. Reference numeral 16 refers to a first hydraulic pressure control device which may be an anti-skid actuator, a brake pressure proportioning control valve or a load sensing brake pressure proportioning control valve. A second hydraulic pressure control device 17 (for example a balance valve) is also set forth in combination with front wheel cylinders 18 and 19.

In FIG. 1 a first control device 16, inlet 20 (see FIG. 3), outlet 21, and port 23 connected to a vacuum source such as an engine intake manifold are provided. Cut valve 24 includes spring 25, ball 26 and seat 27. Whole plug 28 is threaded with body 29 and body 30 is secured to body 29. Reference numeral 31 refers to a variable volume chamber, the effective volme of which is variable in response to slidable movement of piston 32 so that wheel cylinder pressure at rear cylinder 10 is increased or decreased. Reference numeral 33 refers to a guide member while reference numeral 34 indicates a seal.

Servo piston 35 is supported by diaphragm 36 to thereby define first and second chambers 37, 38. Reference numeral 39 indicates a spring biasing piston 32 through piston 35 so that the effective volume of chamber 31 is normally minimized and cut valve 24 is normally maintained in an open position. Change-over selenoid valve 40 includes a coil 41, moving core 42, valve member 43, and spring 44. Atmospheric inlet port 45 is normally interrupted from chambers 37 and 38. Both chambers 37 and 38 are normally in communication through chamber 46, passages 47, 48, 49, while reference numerals 50, 51 (see FIG. 3) indicate conduits.

In FIG. 2, second control valve 17 includes inlet 52 (see FIG. 3), outlet 53, inlet 54, body 55 and plugs 56, 57 with reference numerals 58, 59 indicating conduits. Balance piston 60 has one end which is subjected to control chamber 61 and the other end which is brought into contact with a cut valve 62 while reference numerals 63 and 64 designate springs.

Cut valve 62 controls fluid communication between inlet 52 and variable volume chamber 65 which form a passage. Hydraulic pressure within chamber 61 opposes hydraulic pressure within chamber 65 and urges balance piston 60 into a position wherein the effective volume of the chamber is minimized, and also urges cut valve 62 into its opening position.

In operation, under normal braking operation, the brake pressure from second source 14 of master cylinder 12 is transmitted to front wheel cylinder 18 and to rear wheel cylinder 10 through inlet 20, cut valve 24, chamber 31, and outlet 21. The brake pressure from first source 13 of master cylinder 12 is transmitted to front wheel cylinder 19 and to rear wheel cylinder 11 through inlet 52, cut valve 62, chamber 65, and outlet 53.

When the wheels are substantially locked, solenoid valve 40 is actuated by an electrical signal from a computor (not shown) and valve 43 interrupts the communication between chamber 46 and passage 48. At the same time, chamber 37 receives atmospheric pressure from inlet 45, chamber 46 and passage 47.

Since vacuum is established within chamber 38, there now is pressure difference between pressures within chambers 37, 38. Thus piston 35 is moved to the right against spring 39 and piston 32 follows and cut valve 24 is now closed. By further movement of piston 32, the effective volume of chamber 31 is increased to thereby reduce or decrease brake hydraulic pressure at rear wheel cylinder 10. Thus, the substantial locking condition will be released.

Under the above condition, hydraulic pressure within the control chamber 61, which is the same as the output pressure from the device 16, is reduced. Thus balance piston 60 is moved to the right and cut valve 62 is closed. Since piston 60 is further moved to reduce the effective volume of chamber 65 to thereby reduce brake hydraulic pressure at rear wheel cylinder 11, brake hydraulic pressures at both rear wheel cylinders 10, 11 will be reduced at the same rate and will be equal to each other.

It is to be understood that a brake pressure proportioning valve which proportionally reduces increases in output pressure to increases in input pressure may be substituted for the above-discussed anti-skid actuator 16 of the first embodiment. A conventional load sensing brake pressure proportioning valve may also be substituted.

In a modification of the invention of FIGS. 1 and 2 as shown, the same parts are represented by the corresponding reference numerals set forth in the previous embodiment. In this modification, a second device 100 further includes inlet port 101 which is connected to branch conduit 102 from conduit 50. One end of piston 103 is subjected to pressure from chamber 104 which is in communication with port 101, and thus piston 103 is urged by hydraulic pressure within chamber 104 and spring 105 to the left so that the other end of piston 103 urges a by-pass ball valve 106 in a first direction. As a result, valve 106 is disengaged from seat 113 and the fluid communication between chamber 65 and port 53 is completed. By-pass valve 106 is also urged in a second direction by a member 107 which is, in turn, biased by a spring 108 wherein valve 106 is disengaged from seat 114 and engages with seat 113 with chamber 109 being in direct communication with port 53. The chamber 109 is always in communication with port 52 through by-pass passage 110. A seat member 111 and plug 112 for air bleeding is also provided.

In operation of this modification under normal braking operation, brake pressure at port 52 of second device 100 is transmitted to port 53 through cut valve 62 disengaged from seat 67, chamber 65, and cut valve 106 is disengaged from seat 113. Other normal braking operation will be the same as that of the previous embodiment and skid conditions of wheels will be released in the same manner as that of the previous embodiment.

During the above-noted conditions, by-pass valve 106 is maintained in its illustrated position (i.e. there is no hydraulic pressure force urging the member 107 to the right). When the source 14 of master cylinder 12 fails to operate, there is no substantial hydraulic pressure within chamber 104 of second device 100. Piston 103 is now moved to the right by hydraulic pressure within chamber 65. By-pass valve 106 follows by member 107 such that hydraulic communication between chamber 65 and port 53 is interrupted and hydraulic communication between chamber 109 and port 53 is completed. Since there is no hydraulic pressure within chamber 61, piston 60 is also moved to the right by hydraulic pressure within chamber 65 so that cut valve 62 engages with seat 67. Thus, port 52 is now directly connected to port 53 through by-pass valve 106 to thereby assure sufficient braking force.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A hydraulic pressure control system for a split brake system which comprises:
   a tandem master cylinder having first and second hydraulic pressure sources;
   at least first and second rear wheel cylinders;
   a first brake pressure supply line communicating said first source with said first rear wheel cylinder;
   a second brake pressure supply line communicating said second source with said second rear wheel cylinder;
   a first hydraulic pressure control device positioned within said first supply line for controlling output hydraulic pressure transmitted therefrom with respect to hydraulic pressure transmitted from said first source; and
   a second hydraulic pressure control device including a housing positioned within said second supply line and including a balance piston mounted in said housing and a first passage formed in said housing for controlling output hydraulic pressure transmitted therefrom with respect to input hydraulic pressure transmitted from said second source in response to output hydraulic pressure transmitted from said first control device, said second hydraulic pressure control device further including a by-pass passage formed in said housing, a second piston disposed within said housing, one end thereof receiving hydraulic pressure from said first source and the other end thereof receiving hydraulic pressure transmitted through said valve means which is normally open by said balance piston and second valve means disposed within said first passage such that said first passage is normally open for passing fluid between said valve means and said second supply line such that said second valve means also normally closes said by-pass passage and, upon failure of said supply line, said second valve means opens said by-pass passage and, at the same time, interrupts communication between said first passage and said balance piston.

2. A hydraulic pressure control system as set forth in claim 1 wherein said first and said second control devices include means for reducing hydraulic pressure transmitted therefrom.

3. A hydraulic pressure control system as set forth in claim 1 wherein said first control device comprises a brake pressure proportioning control valve means for proportionally reducing increases in output pressure with respect to input pressure increases to said brake pressure proportioning control valve means.

4. A hydraulic pressure control system as set forth in claim 1, said second hydraulic control device housing further comprises:
   a first inlet communicating with said second brake pressure supply line, a second inlet communicating with said first hydraulic control device, and an outlet communicating with said second rear wheel cylinder; and
   cut off valve means mounted in said housing wherein said piston means mounted in said housing is operably engageable with said cut off valve means for controlling output hydraulic pressure from said second source to said second rear wheel cylinder in response to pressure communicated to said second inlet of said housing from said first control device.

5. A hydraulic pressure control system as set forth in claim 1 wherein said second hydraulic control device housing comprises:
 a first inlet communicating with said second brake pressure supply line, a second inlet communicating with said first hydraulic control device, a first outlet communicating with said second wheel cylinder, and a third inlet;
 a conduit communicating said first brake pressure supply line with said third inlet of said housing; and
 cut off valve means mounted in said housing wherein said piston means mounted in said housing operably is engageable with said cut off valve for controlling output hydraulic pressure from said second source to said second rear wheel cylinder in response to pressure communicated to said second inlet of said housing from said first control device.

* * * * *